United States Patent [19]

Linzer et al.

[11] Patent Number: 5,719,964
[45] Date of Patent: Feb. 17, 1998

[54] ARRAY PROCESSING WITH FUSED MULTIPLY/ADD INSTRUCTION

[75] Inventors: Elliot Neil Linzer, New York; Ephraim Feig, Briarcliff, both of N.Y.

[73] Assignee: International Business Machines Corporation, Armonk, N.Y.

[21] Appl. No.: 541,764

[22] Filed: Oct. 10, 1995

Related U.S. Application Data

[63] Continuation of Ser. No. 176,286, Dec. 30, 1993, abandoned, which is a continuation of Ser. No. 47,755, Apr. 14, 1992, abandoned, which is a continuation of Ser. No. 941,771, Sep. 4, 1992, abandoned, which is a continuation of Ser. No. 559,002, Jul. 27, 1990, abandoned.

[51] Int. Cl.$^6$ ............................................. G06K 9/36
[52] U.S. Cl. ........................... 382/250; 382/276; 364/750.5
[58] Field of Search ............................ 382/276, 302, 382/205, 250; 364/726, 736, 750.5, 754, 841, 768

[56] References Cited

U.S. PATENT DOCUMENTS

| | | | |
|---|---|---|---|
| 4,805,228 | 2/1989 | Jenkins et al. | 382/41 |
| 4,860,373 | 8/1989 | Hartless et al. | 382/41 |
| 4,918,742 | 4/1990 | Simonds | 382/41 |

OTHER PUBLICATIONS

M.J. Narassimha et al., "On the Computation of the Discrete Cosine Transform", IEEE Trans. on Comm., vol. COM–26, No. 6, Jun. 1978, pp. 934–936.

J. Makhoul, "A Fast Cosine Transform in One and Two Dimensions", IEEE Tran. on Acoustics, Speech, & Signal Processing, vol. ASSP–28, No. 1, Feb. 1980, pp. 27–34.

B. Lee, "A New Algorithm to Compute the Discrete Cosine Transform", IEEE Tran. on Acoustics, Speech and Signal Processing, vol. ASSP–32, No. 6, Dec. 1984, pp. 1243–1245.

W–H Chen, et al., "A Fast Computational Algorithm for the Discrete Cosine Transform", IEEE Tran. on Comm., vol. 25, No. 9, Sep. 1977, pp. 1004–1009.

K.S. Shanmugam, "Comments on 'Discrete Cosine Transform'", IEEE Trans. Comput. vol. C–24 p. 759.

N. Ahmed, et al., "Discrete Cosine Transform", IEEE Tran. on Computers, Jan. 1974, pp. 90–93.

H.S. Hou, "A Fast Recursive Algorithm for Computing the Discrete Cosine Transform", IEEE Tran. on Acous., Speech & Signal Processing, vol. ASSP–35, No. 10, Oct. 1987 pp. 1455–1461.

N. Suehiro, et al., "Fast Algorithm for the DFT and Other Sinusoidal Transforms", IEEE Tran. on Acous., Speech & Signal Processing, vol. ASSP–34, No. 3, Jun. 1986, pp. 642–644.

*Primary Examiner*—Joseph Mancuso
*Attorney, Agent, or Firm*—Daniel P. Morris

[57] ABSTRACT

Array processing for carrying out scaled-transform/descaled-inverse-transform procedures on data arrays encoding a visual image or other physical variable makes effective use of fused multiply/add instructions in computer workstations or other digital processors having a fused multiply/add capability. To reconstruct data representative of a physical variable from data originally representative of the variable which had been transformed according to a scaled discrete cosine transform procedure using a predetermined scaling matrix Q, an inverse transform procedure of the invention involves computing a descaling constant and a sequence of descaling/inverse-transform matrices which incorporate elements of the scaling matrix Q. One point of the input data array is multiplied by the descaling constant. The result is matrix multiplied by the sequence of descaling/inverse-transform matrices in turn. The descaling-inverse-transform matrices have the property that each matrix multiplication can involve arithmetic operations of exclusively fused signed multiply/add operations, which can be carried out with great efficiency on a computer workstation with fused signed multiply/add capability.

6 Claims, 1 Drawing Sheet

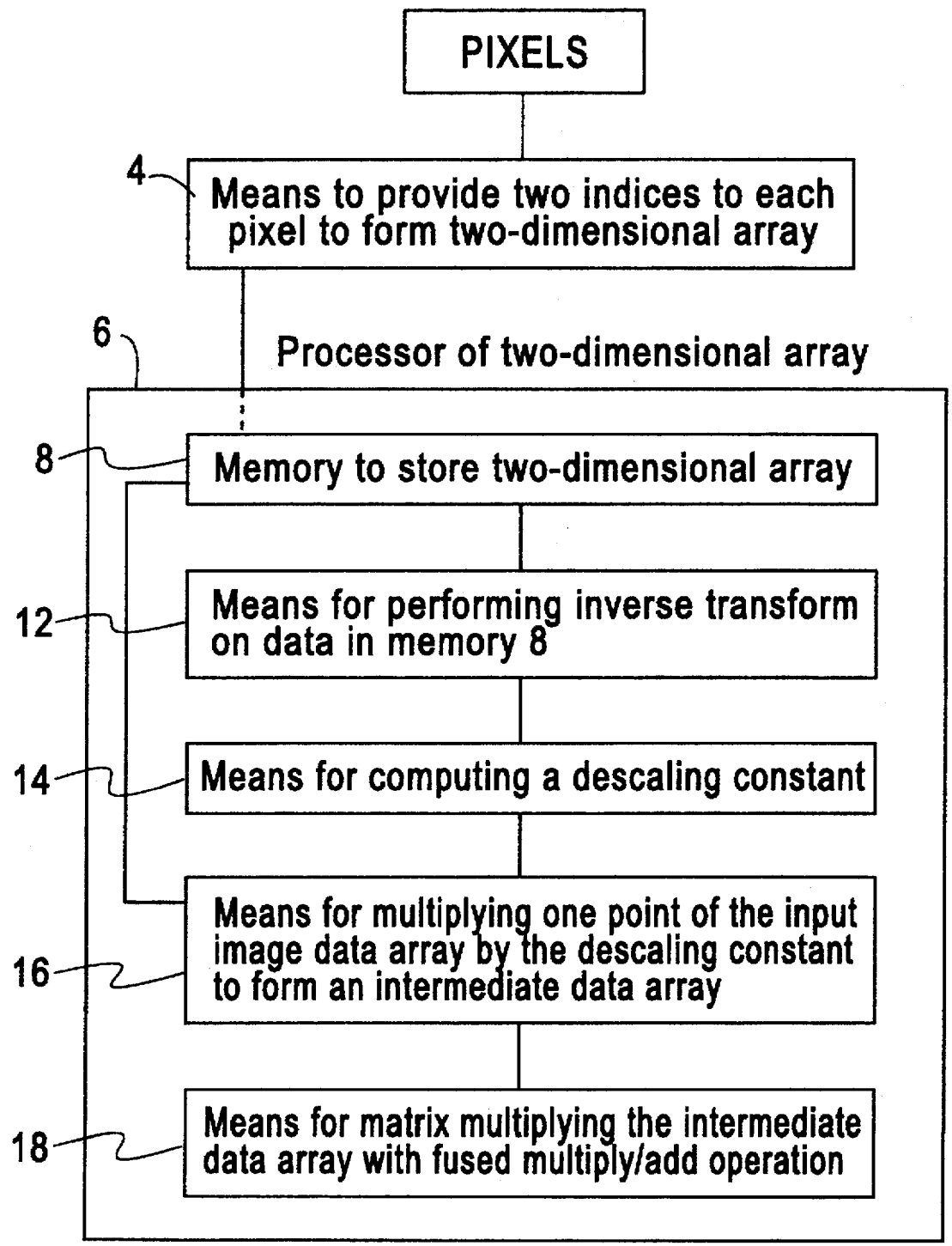
Figure

ARRAY PROCESSING WITH FUSED MULTIPLY/ADD INSTRUCTION

This is a file-wrapper continuation of application Ser. No. 08/176,286, filed Dec. 30, 1993, now abandoned, which is a continuation of application Ser. No. 08/047,755, filed Apr. 14, 1993, now abandoned, which application is a continuation of application Ser. No. 07/941,771, filed Sep. 4, 1992, now abandoned, which is a continuation of application Ser. No. 07/559,002, filed 27 Jul. 1990, now abandoned.

FIELD OF THE INVENTION

The present invention broadly concerns an array processor and array-processing method suitable for processing efficiently arrays of numeric data. More particularly, the present invention concerns an array processor and array-processing method adapted for the analyzing, transforming, filtering, compressing, coding, decoding, reconstructing and the like of one, two, or higher dimensional data arrays, such as two-dimensional arrays of image data.

BACKGROUND ART

A picture or other planar visual image can be represented numerically to a desired degree of accuracy by dividing the image into a two-dimensional array of sufficiently-small picture elements—termed "pixels"—and assigning a numeric value to each pixel which appropriately represents the brightness or other visual quality of the image over the pixel. The various numeric values in a collection of such image data representing a visual image can be conveniently indexed by two independent indices which represent two coordinates defining the location of the pixel in the image. Thus, a collection of numeric values representing a planar visual image can be conveniently treated as a two-dimensional array of numbers.

Two-dimensional arrays of image data can be processed digitally in a digital computer or other digital processor for example, to analyze the image represented by the data or to alter the image to enhance the display of particular aspects of the image.

One application of digital processing of two-dimensional arrays of numeric data representing visual images which is of increasing importance has the goal of reducing the number of numeric values needed to represent a given image without diminishing unduly the visual quality of the image. Reducing the number of image-data values required to represent an image satisfactorily is advantageous, since if the number of image-data values can be reduced, the number of digital representations of images which can be stored in a digital memory of given capacity can be increased and the speed with which a digital representation of an image can be transmitted from one point to another digitally can be increased. Digital processing techniques which serve to reduce the number of numeric values needed to represent a visual image are refereed to generally as image-data "compression" techniques.

In a number of digital image-processing applications, the discrete cosine transform plays an important role. Of particular importance for many such applications are the two-dimensional forward discrete cosine transform and inverse discrete cosine transform for two-dimensional arrays of numbers. The output values from a two-dimensional forward discrete cosine transform carried out, for example, on an 8×8 array of values, are referred to as discrete-cosine-transform coefficients. Often in image-processing applications, two-dimensional arrays of discrete-cosine-transform coefficients are subjected to a process referred to as "quantization," which involves dividing individual coefficients by a scale factor which depends on the position of the coefficient in the array, and then either rounding or truncating the result. In particular, quantized discrete cosine transforms have been widely used in data compression techniques for continuous-tone color images. See, for example, A. K. Jain *Fundamentals of Digital Image Processing*, (Prentice Hall, Englewood Cliffs, N.J., 1989); W. B. Pennebaker et al. *IBM Journal of Research and Development*, volume 32, pages 717–726 (November 1988); J. L. Mitchell and W. B. Pennebaker, ibid. pages 727–736; W. B. Pennebaker and J. L. Mitchell, ibid. pages 737–752; and Arai et al. *Transactions of the IEICE*, Volume E 71, pages 1095–1097 (November 1988). See also U.S. patent applications Ser. No. 07/403,631, filed 6 Sep. 1989, of E. Feig and S. Winograd, and Ser. No. 07/484,149, filed 23 Feb. 1990, of E. Feig and J. L. Mitchell.

Computation of discrete cosine transforms and inverse discrete cosine transforms using conventional techniques and conventional digital processors can require substantial amounts of time for many applications. In particular, the computation of the myriad number of two-dimensional discrete cosine transforms and two-dimensional inverse discrete cosine transforms for the 8×8 blocks of image data for a visual image can require a substantial amount of time using conventional techniques on a general-purpose computer workstation, which can be a disadvantage in certain image processing applications. Recently, computer workstations having a reduced instruction set ("RISC") architecture have become available which include a fused signed multiply/add instruction among the intructions for floating point arithmetic. The fused multiply/add instruction invokes a fused signed multiply/add operation which is hardwired in the workstation to perform the accumulate function $(a \times b) + c$ for signed floating-point numbers a, b, c. See, for example, R. K. Montoye et al. in *IBM Journal of Research and Development*, Volume 34, pages 59 through 70 (January 1990). Conventional discrete cosine transform and inverse discrete cosine transform processes can be carried out satisfactorily with such computer workstations, but in general such conventional processes do not take special advantage of the fused signed multiply/add instruction for floating point arithmetic. In view of the significant computation time required for forward and inverse discrete cosine transform processes for many applications—particularly for image processing applications—any reduction in the computation time required for such processes would be welcome.

BRIEF DESCRIPTION OF THE DRAWINGS

FIGURE schematically shows an example of an apparatus according to the present invention.

SUMMARY OF THE INVENTION

We have invented an array-processing method which makes effective use the fused multiply/add instructions of computer workstations or other digital processors having fused multiply/add capability.

In a first embodiment the array-processing method of the invention comprises performing an inverse transform procedure on an input data array having a dimensionality of m, where m is an integer greater than or equal to one. The input data array is a scaled discrete cosine transform of data representative of a physical variable. The inverse transform procedure is an inverse of an m-dimensional discrete cosine transform scaled according to a predetermined scaling matrix Q.

The inverse transform procedure of the first embodiment of the invention includes the operation of computing a descaling constant and a seqence of descaling/inverse-transform matrices incorporating elements of the scaling matrix Q.

The inverse transform procedure of the first embodiment includes multiplying one point of the input data array by the descaling constant.

The inverse transform procedure of the first embodiment also includes the step of matrix multiplying the resulting array by the sequence of descaling/inverse-transform matrices in turn. The descaling/inverse-transform matrices are constituted such that each matrix multiplication involves fused signed multiply/add operations exclusively.

In the first embodiment of the invention, an inverse transform procedure of a scaled discrete cosine transform procedure may be accomplished with simultaneous descaling. Such embodiments are particularly advantageous in image processing applications when the scaling matrix is fixed or when the digital processor is readily programmable to take account of differing scaling matrices.

In a second embodiment of the invention, descaling is carried out subsequent to an inverse discrete cosine transform procedure. Such a second embodiment may be particularily advantageous for dedicated array processors in applications in which various scaling matrices may be used.

In a third embodiment of the invention exemplified below, forward discrete cosine transform procedures are accomplished making effective use of fused signed multiply/add operations.

Preferred embodiments of the array processing method of the invention can be carried out at high speed and are particularly suitable for image processing applications.

PREFERRED EMBODIMENTS FOR CARRYING OUT THE INVENTION

The FIGURE schematically show an example of an embodiment of the present invention which is an apparatus for processing an array of numerical data corresponding to a visual image having pixels 2 for storing the array of numerical data corresponding to the visual image; each of the pixels 2 contains a numeric value representing a visual quality of the visual image over the pixel. There is a means 4 for providing two independent indices to each of the pixels which represent two coordinates defining the location of each of the pixels in the image, thereby a collection of numeric values representing said visual image can be treated as a two-dimensional array of numbers. There is a means 6 for processing the two-dimensional array of numbers to analyze the visual image or to alter the visual image, the means for processing comprising a memory 8 to store a digital representation of the visual image; and the means for processing comprises a fused signed multiply/add instructions 10 which invokes a fused signed multiply/add operation which is hard wired in the computer to perform an accumulate function (a×b)+c for signed floating point numbers a, b and c. There is a means for performing an inverse transform procedure 12 on an input two-dimensional quantized transformed image data array, the input image data array being a scaled discrete cosine transform of data representative of said visual image scaled according to a predetermined image-quantization matrix, the inverse transform procedure being an inverse of a two-dimensional scaled discrete cosine transform procedure scaled according to the image-quantization matrix, the inverse transform procedure including the following operations. There is a means for computing 14 a descaling constant and a plurality of two-dimensional descaling/inverse-transform matrices incorporating elements of the image-quantization matrix. There is a means for multiplying 16 one point of the input image data array by the descaling constant to form an intermediate data array. There is a means for matrix multiplying 18 the intermediate data array with a digital processor capable of performing fused multiply/add operations by a sequence of the descaling/inverse-transform matrices in turn, said matrix multiplication carried out by said digital processor exclusively using arithmetic operations from the group consisting of multiply/add, multiply/subtract, and negative multiply/add.

The following notation is used below for convenience. An 8×8 diagonal matrix $$A = \begin{pmatrix} a1 & 0 & 0 & 0 & 0 & 0 & 0 & 0 \\ 0 & a2 & 0 & 0 & 0 & 0 & 0 & 0 \\ 0 & 0 & a3 & 0 & 0 & 0 & 0 & 0 \\ 0 & 0 & 0 & a4 & 0 & 0 & 0 & 0 \\ 0 & 0 & 0 & 0 & a5 & 0 & 0 & 0 \\ 0 & 0 & 0 & 0 & 0 & a6 & 0 & 0 \\ 0 & 0 & 0 & 0 & 0 & 0 & a7 & 0 \\ 0 & 0 & 0 & 0 & 0 & 0 & 0 & a8 \end{pmatrix}$$

is also written

A=Diag (a1 a2 a3 a4 a5 a6 a7 a8).

The transpose of a matrix A is written $A^t$.

I. One-Dimensional Inverse Scaled Discrete Cosine Transform With Simultaneous Descaling In general, a one-dimensional inverse scaled discrete cosine transform process for eight points involves evaluation of the following matrix product:

(IMAT)Q$\bar{v}$, where (IMAT) is the inverse discrete cosine transform matrix for eight points, Q is a diagonal matrix for the rescaling or dequantizing, and $\bar{v}$ is an eight-point input data vector. In a preferred one-dimensional eight-point inverse scaled discrete cosine transform procedure of the invention, the matrix product set forth above is evaluated as set forth below.

A diagonal matrix D is defined as follows:

D=Diag (c4 c4 c2 c1 c5 c2 c1 c5), where cj=cos($\pi$j/16) for j=1, 2, 4, and 5.

A permutation matrix $P_3$ is defined by the operation on an arbitrary vector (a1 . . . a8)$^t$:

$P_3$(a1 a2 a3 a4 a5 a6 a7 a8)$^t$=(a1 a4 a3 a8 a2 a5 a6 a7)$^t$.

A matrix F is defined by

F=D $P_3'$Q $P_3$.

The matrix F is a diagonal matrix which depends upon the particular quantization matrix Q being used. In the diagonal notation, the matrix F may be written as follows to define eight diagonal elements f1 . . . f8:

F=Diag (f1 f2 f3 f4 f5 f6 f7 f8).

Three constants denoted t1, t2, and t5 are defined as follows:

tk=tan($\pi$k/16), for k=1, 2, and 5.

Using the diagonal elements of the matrix F the following fifteen values formed:

| | | |
|---|---|---|
| r1 = t2 f6/f3 | r2 = t2 f3/f6 | |
| r2 = t1 f7/f4 | r2 = t1 f4/f7 | |
| r3 = t5 f8/f5 | r6 = t5 f5/f8 | |
| r7 = f5/f4 | r10 = f3/f1 | r13 = f4/f1 |
| r8 = f8/f7 | r11 = f6/f1 | r14 = f7/f1 |
| r9 = f2/f1 | r12 = f4/f7 | r15 = c4 r14. |

The one-dimensional scaled inverse discrete cosine transform for eight points is then given by:

$$(\text{IMAT})Q = (f1) P_1 A_3 A_2 A_2 A_1 P_2 C R P_3,$$

where $$R = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & r1 & 0 & 0 \\ 0 & 0 & 0 & 1 & 0 & 0 & r2 & 0 \\ 0 & 0 & 0 & 0 & 1 & 0 & 0 & r3 \\ 0 & 0 & r4 & 0 & 0 & -1 & 0 & 0 \\ 0 & 0 & 0 & r5 & 0 & 0 & -1 & 0 \\ 0 & 0 & 0 & 0 & r6 & 0 & 0 & -1 \end{pmatrix}$$

$$C = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & r7 & 0 & 0 & 0 \\ 0 & 0 & 0 & 1 & -r7 & 0 & 0 & 0 \\ 0 & 0 & 0 & 0 & 0 & 1 & 0 & 0 \\ 0 & 0 & 0 & 0 & 0 & 0 & 1 & r8 \\ 0 & 0 & 0 & 0 & 0 & 0 & 1 & -r8 \end{pmatrix}$$

$$A_1 = \begin{pmatrix} 1 & r9 & 0 & 0 & 0 & 0 & 0 & 0 \\ 0 & -r9 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}$$

$$A_2 = \begin{pmatrix} 1 & 0 & r10 & 0 & 0 & 0 & 0 & 0 \\ 0 & 1 & 0 & r11 & 0 & 0 & 0 & 0 \\ 1 & 0 & -r10 & 0 & 0 & 0 & 0 & 0 \\ 0 & 1 & 0 & -r11 & 0 & 0 & 0 & 0 \\ 0 & 0 & 0 & 0 & 1 & 0 & 0 & 0 \\ 0 & 0 & 0 & 0 & 0 & 1 & 0 & r12 \\ 0 & 0 & 0 & 0 & 0 & 0 & 1 & 0 \\ 0 & 0 & 0 & 0 & 0 & 1 & 0 & -r12 \end{pmatrix}$$

$$A_3 = \begin{pmatrix} 1 & 0 & 0 & 0 & r13 & 0 & 0 & 0 \\ 0 & 1 & 0 & 0 & 0 & r15 & 0 & 0 \\ 0 & 0 & 1 & 0 & 0 & 0 & r14 & 0 \\ 0 & 0 & 0 & 1 & 0 & 0 & 0 & r15 \\ 1 & 0 & 0 & 0 & -r13 & 0 & 0 & 0 \\ 0 & 1 & 0 & 0 & 0 & -r15 & 0 & 0 \\ 0 & 0 & 1 & 0 & 0 & 0 & -r14 & 0 \\ 0 & 0 & 0 & 1 & 0 & 0 & 0 & -r15 \end{pmatrix}$$

$$P_1 = \begin{pmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 1 \\ 0 & 0 & 1 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 1 & 0 & 0 & 0 \end{pmatrix}$$

$$P_2 = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 0 & 1 & 0 & 0 \\ 0 & 0 & 0 & 1 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 1 & 0 & 0 & 0 \end{pmatrix}$$

$$P_3 = \begin{pmatrix} 1 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 1 & 0 & 0 & 0 & 0 \end{pmatrix}$$

It will be appreciated that all arithmetic operations are of the form multiply-add, multiply-subtract, or negative-multiply-add. Each of these operations can be performed efficiently with a fused signed multiply/add instruction. The computational cost in terms of fused signed multiply/add operations is as follows:

| Product by | operations |
|---|---|
| R | 6 |
| C | 4 |
| $A_1$ | 2 |
| $A_2$ | 6 |
| $A_3$ | 8 |
| Total | 26. |

If f1=1, then the output is scaled correctly. Hence by rescaling the zero-frequency component only, a correctly scaled output is obtained.

II. Two-Dimensional 8×8 Inverse Scaled Discrete Cosine Transform With Simultaneous Descaling For the two-dimensional case, following procedure is preferred:

1. Dequantize the zero-frequency or DC component. The computational cost is one multiplication.
2. Take the one-dimensional inverse scaled discrete cosine transform each of the eight rows. This procedure involves invoking the preferred one-dimensional inverse scaled discrete cosine transform procedure described in section I above eight times. The result for the first row will be scaled correctly, since the zero-frequency component of that row has been scaled correctly. The other seven rows will not be correctly scaled at this stage. The computational cost of this step is 8×26=208 signed multiply/add operations.
3. Take the one-dimensional inverse scaled discrete cosine transform of each of the resulting eight columns. This procedure again involves invoking the one-dimensional procedure described in section I above eight times. Because the first entry of each column is scaled correctly by virtue of the first row having been scaled correctly, all the outputs of this stage will be scaled correctly. The computational cost of this step is again 8×26=208 signed multiply/add operations.

The total computational cost for the preferred two-dimensional scaled inverse discrete cosine procedure is 417 operations; 416 are fused signed multiply-add operations and one is a simple multiplication. With an arbitrary quantization matrix, each of the row transforms will in general involve a different set constants, whereas each of the column transforms will involve the same set of constants.

In Appendix A below computer programs for implementing the preferred inverse scaled discrete cosine transform procedures for one and two dimensions of sections I and II are given in an APL programming language.

The subroutine labelled "DIAG V" in Appendix A takes an arbitrary k-vector V and forms a k×k diagonal matrix whose diagonal elements are the entries of V taken in order.

The subroutine labelled "A DIRSUM B" takes arbitrary square matrices A and B of dimensions a×a and b×b, respectively, and forms the matrix A+B of dimension (a+b) x(a+b) which is the direct sum of the matrices A and B.

The routine labelled "ABSORB0" prepares the matrices $A_1$, $A_2$, $A_3$, C and R for the preferred one-dimensional inverse scaled discrete cosine transform procedure of section I above. In line 2 of the routine, "ABSORB0" 5ABS is the diagonal matrix D defined above.

The routine labelled "ABSORB3" prepares the matrices for the preferred two-dimensional procedure of section III. The routine "ABSORB3" calls on the subroutine "ABSORB0" eight times in turn for the eight rows and once for all eight columns. The outputs of the routine "ABSORB3" are nine arrays labelled "ABSMATj", j=1, 2, . . . 9. Each output array is a 5×8×8 arrays, corresponding to the five matrices $A_1$, $A_2$, $A_3$, C and R required for each of the nine distinct one-dimensional routine calls.

III One-Dimensional Scaled Discrete Cosine Transform

The forward scaled discrete cosine transform based on the relation:

$$(MAT) = P\ D\ R\ C\ A_1\ A_2\ A_3$$

where (MAT) is the eight-point discrete cosine transform matrix and the other matrices are given to 4 decimal places below.

$$A_1 = \begin{pmatrix} 1 & 1 & 0 & 0 & 0 & 0 & 0 & 0 \\ 1 & -1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 1 \\ 0 & 0 & 1 & 0 & 0 & 0 & 0 & 0 \\ 0 & 0 & 0 & 0 & 0 & 0 & 1 & 0 \\ 0 & 0 & 0 & 0 & 0 & 1 & 0 & 0 \end{pmatrix}$$

$$A_2 = \begin{pmatrix} 1 & 0 & 1 & 0 & 0 & 0 & 0 & 0 \\ 0 & 1 & 0 & 1 & 0 & 0 & 0 & 0 \\ 1 & 0 & -1 & 0 & 0 & 0 & 0 & 0 \\ 0 & 1 & 0 & -1 & 0 & 0 & 0 & 0 \\ 0 & 0 & 0 & 0 & 1 & 0 & 0 & 0 \\ 0 & 0 & 0 & 0 & 0 & 1 & 0 & 1 \\ 0 & 0 & 0 & 0 & 0 & 0 & 1 & 0 \\ 0 & 0 & 0 & 0 & 0 & 1 & 0 & -1 \end{pmatrix}$$

$$A_3 = \begin{pmatrix} 1 & 0 & 0 & 0 & 0 & 0 & 0 & 1 \\ 0 & 1 & 0 & 0 & 0 & 0 & 1 & 0 \\ 0 & 0 & 0 & 1 & 1 & 0 & 0 & 0 \\ 0 & 0 & 1 & 0 & 0 & 1 & 0 & 0 \\ 1 & 0 & 0 & 0 & 0 & 0 & 0 & -1 \\ 0 & 1 & 0 & 0 & 0 & 0 & -1 & 0 \\ 0 & 0 & 0 & 1 & -1 & 0 & 0 & 0 \\ 0 & 0 & -1 & 0 & 0 & 1 & 0 & 0 \end{pmatrix}$$

$$C = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0.7071 & 0 & 0 & 0 \\ 0 & 0 & 0 & 1 & -0.7071 & 0 & 0 & 0 \\ 0 & 0 & 0 & 0 & 0 & 1 & 0 & 0 \\ 0 & 0 & 0 & 0 & 0 & 0 & 1 & 0.7071 \\ 0 & 0 & 0 & 0 & 0 & 0 & 1 & -0.7071 \end{pmatrix}$$

$$D = \begin{pmatrix} 0.3536 & 0 & 0 & 0 & 0 & 0 & 0 & 0 \\ 0 & 0.3536 & 0 & 0 & 0 & 0 & 0 & 0 \\ 0 & 0 & 0.4619 & 0 & 0 & 0 & 0 & 0 \\ 0 & 0 & 0 & 0.4904 & 0 & 0 & 0 & 0 \\ 0 & 0 & 0 & 0 & 0.2778 & 0 & 0 & 0 \\ 0 & 0 & 0 & 0 & 0 & 0.4619 & 0 & 0 \\ 0 & 0 & 0 & 0 & 0 & 0 & 0.4904 & 0 \\ 0 & 0 & 0 & 0 & 0 & 0 & 0 & 0.2788 \end{pmatrix}$$

$$R = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0.4142 & 0 & 0 \\ 0 & 0 & 0 & 1 & 0 & 0 & 0.1989 & 0 \\ 0 & 0 & 0 & 1 & 0 & 0 & 0 & 1.497 \\ 0 & 0 & 0.4142 & 0 & 0 & -1 & 0 & 0 \\ 0 & 0 & 0 & 0.1989 & 0 & 0 & -1 & 0 \\ 0 & 0 & 0 & 0 & 1.497 & 0 & 0 & -1 \end{pmatrix}$$

$$P = \begin{pmatrix} 1 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \end{pmatrix}$$

The real-value entries in the matrices above are approximated to four decimal places. The actual real values are as follows: the diagonal entries in the matrix D are c4, c4, c2, c1, c5, c2, c5, respectively, where $c_j = \cos(\pi j/16)$. The non-rational entries in the matrix C are $\pm\sqrt{2}/2$. The non-rational entries in the matrix R are t2, t1, t5, where $t_k = \tan(\pi k/16)$.

The products by $A_3$, $A_2$, $A_1$ can be done with 8, 6, and 2 signed additions respectively. The products by C and R can be done with 4 and 6 signed multiply add operations respectively. The products by P and D can be incorporated into the scaling. Thus the total number of signed multiply/add operations for the entire eight-point scaled discrete cosine transform is 26.

IV Two-Dimensional 8×8 Scaled Discrete Cosine Transform

For a preferred two-dimensional scaled discrete cosine transform on 8×8 points, the one-dimensional discrete cosine transform on eight points is applied in a row-column fashion, 16 times altogether, with a total computational cost of 16×26=416 fused signed multiply/add operations.

V Arbitrary Dimensional Scaled Discrete Cosine Transform

An arbitrary k-dimensional scaled discrete cosine transform can be handled in a similar fashion, using k $8^{k-1}$ times the one dimensional scaled discrete cosine transform on eight points.

VI Scaled Discrete Cosine Transforms for 2 L points, L Integer

For integer powers of 2 greater than 8, the "butterfly" operations followed by scalar multiplications can be incorporated as fused signed multiply/adds in an analogous manner to that employed for matrix C.

VII Inverse Scaled Discrete Cosine Transform

A preferred inverse scaled discrete cosine transform may be based on the formula:

$$(IMAT) = A_{3T} A_2 A_{1T} C_T R_T D P_T$$

where (IMAT) is the eight-point inverse discrete cosine transform matrix, the matrices $A_2$, D are as in section III above, and the other matrices are given to 4 decimal places below. The non-rational entries given to 4 decimal places have real values are as given in section III above.

$$A_{1T} = \begin{pmatrix} 1 & 1 & 0 & 0 & 0 & 0 & 0 & 0 \\ 1 & -1 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 1 & 0 & 0 & 0 \end{pmatrix}$$

$$A_Z = \begin{pmatrix} 1 & 0 & 1 & 0 & 0 & 0 & 0 \\ 0 & 1 & 0 & 1 & 0 & 0 & 0 \\ 1 & 0 & -1 & 0 & 0 & 0 & 0 \\ 0 & 1 & 0 & -1 & 0 & 0 & 0 \\ 0 & 0 & 0 & 0 & 1 & 0 & 0 \\ 0 & 0 & 0 & 0 & 0 & 1 & 0 & 1 \\ 0 & 0 & 0 & 0 & 0 & 0 & 1 & 0 \\ 0 & 0 & 0 & 0 & 0 & 1 & 0 & -1 \end{pmatrix}$$

$$C_T = \begin{pmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 1 & 0 & 0 \\ 0 & 0 & 0 & 1 & -1 & 0 & 0 \\ 0 & 0 & 0 & 0 & 0 & 1 & 0 & 0 \\ 0 & 0 & 0 & 0 & 0 & 0 & 1 & 1 \\ 0 & 0 & 0 & 0 & 0 & 0 & 1 & -1 \end{pmatrix}$$

$$D = \begin{pmatrix} 0.3536 & 0 & 0 & 0 & 0 & 0 & 0 & 0 \\ 0 & 0.3536 & 0 & 0 & 0 & 0 & 0 & 0 \\ 0 & 0 & 0.4619 & 0 & 0 & 0 & 0 & 0 \\ 0 & 0 & 0 & 0.4904 & 0 & 0 & 0 & 0 \\ 0 & 0 & 0 & 0 & 0.2778 & 0 & 0 & 0 \\ 0 & 0 & 0 & 0 & 0 & 0.4619 & 0 & 0 \\ 0 & 0 & 0 & 0 & 0 & 0 & 0.4904 & 0 \\ 0 & 0 & 0 & 0 & 0 & 0 & 0 & 0.2778 \end{pmatrix}$$

$$P_T = \begin{pmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 1 & 0 & 0 & 0 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 1 & 0 & 0 & 0 & 0 \end{pmatrix}$$

$$R_T = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0.4142 & 0 & 0 \\ 0 & 0 & 0 & 1 & 0 & 0 & 0.1989 & 0 \\ 0 & 0 & 0 & 0 & 1 & 0 & 0 & 1.497 \\ 0 & 0 & 0.4142 & 0 & 0 & -1 & 0 & 0 \\ 0 & 0 & 0 & 0.1989 & 0 & 0 & -1 & 0 \\ 0 & 0 & 0 & 0 & 1.497 & 0 & 0 & -1 \end{pmatrix}$$

$$A_{3T} = \begin{pmatrix} 1 & 0 & 0 & 0 & 1 & 0 & 0 & 0 \\ 0 & 1 & 0 & 0 & 0 & 0.7071 & 0 & 0 \\ 0 & 0 & 0 & 1 & 0 & 0 & 0 & -0.7071 \\ 0 & 0 & 1 & 0 & 0 & 0 & 1 & 0 \\ 0 & 0 & 1 & 0 & 0 & 0 & -1 & 0 \\ 0 & 0 & 0 & 1 & 0 & 0 & 0 & 0.7071 \\ 0 & 1 & 0 & 0 & 0 & -0.7071 & 0 & 0 \\ 1 & 0 & 0 & 0 & -1 & 0 & 0 & 0 \end{pmatrix}$$

It is not intended to limit the present invention to the specific embodiments described above. It is recognized that changes may be made in the systems and processes specifically described herein without departing from the scope and teaching of the present invention, and it intended to encompass all other embodiments, alternatives, and modifications consistent with the invention.

APPENDIX A

* Function DIAG *

∇ M←DIAG V;N
[1]  N←ρV
[2]  M←((N,1)ρV),[2](N,N)ρ0
[3]  M←(N*2)ρM
[4]  M←(N,N)ρM
     ∇

87/05/26 10:38:24 * Function DIRSUM *

∇ MAT←A DIRSUM B;M1;M2;N1;N2;H;K;P1;P2
[1]  M1←(ρA)[1]
[2]  M2←(ρA)[2]
[3]  N1←(ρB)[1]
[4]  N2←(ρB)[2]
[5]  H←(M1,N2)ρ0
[6]  K←(N1,M2)ρ0
[7]  P1←A,[2]H
[8]  P2←K,[2]B
[9]  MAT←P1,[1]P2
     ∇

* Function ABSORB0 *

∇ ABSORB0 Q;FM;R1;R2;R3;R4;R5;R6;R7;R8;R9;R10;R11;R12;R13;R14;R15
[1]  ᴀQ IS 8-DIM VECTOR
[2]  F←÷/FM←.5×ABS÷.×(φP3)÷.×(DIAG Q)÷.×P3
[3]  R1←T2×F[6]÷F[3]
[4]  R2←T1×F[7]÷F[4]
[5]  R3←T5×F[8]÷F[5]
[6]  R4←T2×F[3]÷F[6]
[7]  R5←T1×F[4]÷F[7]
[8]  R6←T5×F[5]÷F[8]
[9]  R7←F[5]÷F[4]
[10] R8←F[8]÷F[7]
[11] R9←F[2]÷F[1]
[12] R10←F[3]÷F[1]
[13] R11←F[6]÷F[1]
[14] R12←F[4]÷F[7]
[15] R13←F[4]÷F[1]
[16] R14←C4×R15←F[7]÷F[1]
[17] RTT←DIAG(5ρ1),(3ρ¯1)
[18] RTT[3;6]←R1
[19] RTT[4;7]←R2
[20] RTT[5;8]←R3
[21] RTT[6;3]←R4
[22] RTT[7;4]←R5
[23] RTT[8;5]←R6
[24] CTT←(DIAG 3ρ1)DIRSUM(2 2)ρ1,R7,1,(−R7)
[25] CTT←CTT DIRSUM(1 1)ρ1)DIRSUM(2 2)ρ1,R8,1,(−R8)
[26] A1T←((2 2)ρ1,R9,1,(−R9))DIRSUM DIAG 6ρ1
[27] A2T←(4 4)ρ1,0,R10,0,0,1,0,R11,1,0,(−R10),0,0,1,0,(−R11)
[28] A2T←A2T DIRSUM(4 4)ρ1,0,0,0,0,1,0,R12,0,0,1,0,0,1,0,(−R12)
[29] A3T←(DIAG 4ρ1),DIAG R13,R14,R15,R14
[30] A3T←A3T,[1](DIAG 4ρ1),−DIAG R13,R14,R15,R14
[31] ᴀABSMAT←(P1)÷.×A3T÷.×A2T÷.×A1T÷.×(P2)÷.×CTT÷.×RTT÷.×(P3)
[32] MAT←(5 8 8)ρ(64ρA1T),(64ρA2T),(64ρA3T),(64ρRTT),(64ρCTT)
     ∇

* Function ABSORB3 *

∇ ABSORB 3 Q;J;V;ABSMAT
[1]  J←0
[2]  OUT←HAT←(8 8)ρ0
[3]  V←0ρ0
[4]  Q←Q÷8
[5]  Q[1;1]←1
[6]  ABSORB0 Q[1;]
[7]  ABSMAT1←MAT
[8]  V←V,F[1]
[9]  ABSORB0 Q[2;]
[10] ABSMAT2←MAT
[11] V←V,F[1]
[12] ABSORB0 Q[3;]
[13] ABSMAT3←MAT
[14] V←V,F[1]
[15] ABSORB0 Q[4;]
[16] ABSMAT4←MAT
[17] V←V,F[1]
[18] ABSORB0 Q[5;]
[19] ABSMAT5←MAT
[20] V←V,F[1]
[21] ABSORB0 Q[6;]
[22] ABSMAT6←MAT
[23] V←V,F[1]

APPENDIX A-continued

[24] ABSORB0 Q[7;]
[25] ABSMAT7+MAT
[26] V+V,F[1]
[27] ABSORB0 Q[8;]
[28] ABSMAT8+MAT
[29] V+V,F[1]
[30] ABSORB0 V
[31] ABSMAT9+MAT
▽

We claim:

1. An method for processing visual images represented by an array of numerical data comprising:

displaying said visual image by assigning said array of numerical data to an array pixels;

each pixel of said array of pixels containing a numeric value representing a visual quality of said visual image over said pixel;

providing two independent indices to each of said pixels which represent two coordinates defining the location of each of said pixels in said image, thereby a collection of numeric values representing said visual image can be treated as a two-dimensional array of numbers;

processing said two-dimensional array of numbers to analyze said visual image or to alter said visual image, said means for processing comprising a memory to store digital representations of said visual image;

said processing of said two dimensional array comprises a fused signed multiply/add instruction which invokes a hard wired fused signed multiply/add operation to perform an accumulate function $(a \times b)+c$ for signed floating point numbers a, b and c;

computing a descaling constant and a plurality of two-dimensional descaling/inverse-transform matrices incorporating elements of the image-quantization matrix;

multiplying one point of the input image data array by the descaling constant to form an intermediate data array; and matrix multiplying the intermediate data army with a digital processor capable of performing fused multiply/add operations by a sequence of the descaling/inverse-transform matrices in turn, said matrix multiplication carded out by said digital processor exclusively using arithmetic operations from the group consisting of multiply/add, multiply/subtract, and negative multiply/add.

2. A method according to claim 1 in which said performing an inverse transform procedure performs an inverse of a two-dimensional 8×8 scaled discrete cosine transform procedure.

3. A method according to claim 2 in which the point of the input image data array multiplied by the descaling constant corresponds to a zero-frequency discrete cosine transform component.

4. A method according to claim 3 in which the matrix multiplication by the sequence of descaling/inverse-transform matrices is performed on the intermediate data array on a row/column basis.

5. A method according to claim 4 in which the matrix multiplication by the sequence of descaling/inverse-transform matrices on the intermediate data array on a row/column basis constitutes taking a one-dimensional eight-point inverse scaled discrete cosine transform of each of eight rows of the intermediate data array and subsequently taking a one-dimensional eight-point inverse scaled discrete cosine transform of each of eight resulting columns.

6. A method according to claim 1 in which computing a plurality of two-dimensional descaling/inverse-transform matrices involves computing eight 8×8 matrices.

* * * * *